United States Patent Office 2,774,760
Patented Dec. 18, 1956

2,774,760
PROCESS FOR PRODUCTION OF PYRIMIDINES

Calvert W. Whitehead, Indianapolis, Ind., assignor to Eli Lilly and Company, Indianapolis, Ind., a corporation of Indiana No Drawing. Application October 14, 1953,
Serial No. 386,135

6 Claims. (Cl. 260—256.4)

This invention relates to a novel process for the preparation of substituted pyrimidines.

I have discovered that substituted pyrimidines can readily be synthesized by a reaction which comprises cyclizing, in the presence of an alkaline catalyst, an alkyl orthoformate, a compound containing an active methylene group, and a urea or thiourea having the formula:

$$\underset{\text{RNHCNH}_2}{\overset{\overset{X}{\|}}{}}$$

wherein R represents hydrogen or an alkyl, cycloalkyl, hydroxyalkyl, alkoxyalkyl or aralkyl radical, and X represents oxygen or sulfur.

The course of the reaction is illustrated by the following series of equations, wherein R and X have the same significance as hereinabove, $R_1$ represents a lower alkyl radical, W represents oxygen or an imino group, and

represents a compound containing an active methylene group, Y and Z being representative of those functional groups which have an activating effect on the methylene radical. Illustrative active methylene-group-containing compounds which are useful for the purposes of this invention are the acid, ester, nitrile and amide forms of malonic, cyanoacetic and acetoacetic acids, the 1,3-diketones, and the like, and are exemplified by malonic acid, cyanoacetic acid, ethyl cyanoacetate, ethyl acetoacetate, malononitrile, malonoamide, acetylacetone, acetylacetonitrile, dicarbethoxyacetone, cyanoacetamide and cyclopentane-1,3-dione.

$$(R_1O)_3CH + 2RNH\overset{\overset{X}{\|}}{C}NH_2$$
$$\downarrow$$
$$RNH\overset{\overset{X}{\|}}{C}N\text{=}CHNH\overset{\overset{X}{\|}}{C}NHR$$
$$\downarrow \overset{H_2C\diagup ^Y}{_{\diagdown Z}}$$
$$RNH\overset{\overset{X}{\|}}{C}NHCH\text{=}C\diagup ^Y_{\diagdown Z}$$
$$\downarrow \text{alkaline catalyst}$$

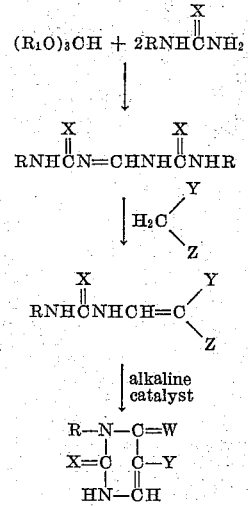

Referring to the equations, it is noted that the process proceeds in steps. In the first step, the condensation of two mols of the urea and one mol of the alkyl orthoformate gives rise to a dicarbamylformamidine. The formamidine reacts mol for mol with the compound containing an active methylene group in the second step to form a substituted ureidoethylene. Under the influence of the alkaline cyclization catalyst, ring closure of the ureidoethylene is effected, producing the desired pyrimidine.

If Y and Z in the above equation are both carbonyl group-containing radicals, W, which is formed from one of those radicals during ring closure, represents oxygen. If either or both of Y and Z are cyano groups, an imino group is formed upon ring closure and W accordingly represents an imino group.

The process can be carried out stepwise by conducting first the condensation of the alkyl orthoformate and the urea, and then isolating the intermediate formamidine. The ureidoethylene intermediate can subsequently be prepared by reacting the formamidine with the active methylene compound, and recovering the product. The ureidoethylene compound can then be cyclized by means of the alkaline catalyst. However, for the synthesis of pyrimidines the isolation of the intermediate formamidine and ureidoethylene is not mandatory. The substituted pyrimidine which is the end product of the process is conveniently obtained in good yield by reacting in the required molar proportions a mixture of the substituted urea, an alkyl orthoformate and a compound having an active methylene group, whereupon condensation to form a substituted ureidoethylene takes place. Addition of the alkaline catalyst to the ureidoethylene brings about ring closure and the formation of the pyrimidine compound.

The substituted pyrimidines which are the products of the process are isolated according to the usual methods of the art. A suitable method of isolation is, for example, the removal as by evaporation of any solvent which may have been used, followed by effective removal, by dilution or decomposition, of the alkaline catalyst, as with water and acid, to precipitate the water-insoluble substituted pyrimidine, which can then be collected and recrystallized.

The basic catalyst which is employed to effect the ring closure can be any alkaline substance which does not react with the substituents of a substituted ureidoethylene to change the ring-closure characteristics thereof, but which is sufficiently soluble in the solvent employed to afford contact with the ureidoethylene intermediate. Examples of alkaline cyclization catalysts which can be used are alkali metal alkoxides, such as sodium ethoxide, potassium ethoxide, sodium isopropoxide, potassium tertiary butoxide and the like; tertiary alkyl ammonium hydroxides, alkali metal hydroxides, alkali metal and alkaline earth metal carbonates, ammonium hydroxide, strongly basic amines such as hydroxylamine and pyridine; and their equivalents.

The process can be carried out over a range of temperatures from about 20° C. to about 150° C. or higher. Temperatures upward of 100° C. increase the speed of the reaction, and shorten the reaction time. As the conditions of reaction are not critical, a most convenient method of temperature control is to heat the reaction mixture to the boiling point of the mixture of reactants. It should be noted that in certain instances cyclization can be effected merely by heating the intermediate ureidoethylene compound. Thus, for example, 3-n-propyl-5-carbethoxyuracil can be formed by heating ethyl n-propylureidomethylene malonate. Likewise, 4,5-dicarbethoxy pyrimidine is formed by heating a mixture of urea, ethyl orthoformate and diethyl oxalacetate in the proper molecular proportions.

To provide conditions of reaction which promote contact of the reagents, a solvent is employed. Any of a number of organic solvents can be used, the only limitation being that the solvent should be relatively inert so that it will not interefere with the reaction. For convenient isolation of the product of reaction, the solvent desirably is selected to have a boiling point sufficiently low so that it can be removed by evaporation. If the solvent employed is one which is not readily removed by evaporation, the reaction product can be isolated by precipitation, as, for example, by adding to the reaction mixture a miscible solvent in which the product is relatively insoluble. To aid in maintaining any elevated temperature at which the reaction is to be carried out, the solvent selected preferably has a boiling point such that the simple refluxing of the reaction mixture will maintain the desired temperature. Alternatively, the solvent can consist of one of the reagents employed, providing it is a liquid or a low-melting solid, and is a reactant which can be employed in excess. The alkyl orthoformates are generally liquids, and can, if used in some excess, exercise the function of a solvent as well as a reactant. In such case no additional solvent is required.

The following examples more specifically illustrate the new process.

EXAMPLE 1

Preparation of 3-cyclohexyl-5-carbomethoxyuracil

A mixture of 100 g. of N-cyclohexylurea and 250 ml. of ethyl orthoformate was refluxed for about twelve hours. On cooling, a precipitate consisting of N,N'-bis-(cyclohexylcarbamyl)-formamidine separated. It was removed by filtration and washed with ether. The formamidine after recrystallization from N,N-dimethylformamide melted at about 207° C.

To a solution of 14.7 g. (0.05 mol) of N,N'-bis-(cyclohexylcarbamyl)-formamidine in 100 ml. of absolute ethanol was added 0.1 mol of malonic ester. The resulting suspension was stirred and heated to about 70° C. After all of the malonic ester had dissolved, the solution was evaporated to dryness under reduced pressure, and the residue was extracted with ether. The ether extract was treated by the addition of petroleum ether to the point of incipient crystallization, and cooled, whereupon diethyl N-cyclohexylureidomethylenemalonate precipitated. The precipitate was removed by filtration, and dried. After recrystallization from a mixture of ether and petroleum ether, diethyl N - cyclohexylureidomethylenemalonate melted at about 92° C.

To a solution of 0.1 mol of diethyl N-cyclohexylureidomethylenemalonate in 50 ml. of methanol were added 5.67 g. (0.11 mol) of sodium methylate, and the solution was allowed to stand at room temperature for about three days. The reaction mixture was then heated at about 80° C. for about six hours, was cooled, and was poured onto about 100 g. of ice. The mixture was acidified with dilute hydrochloric acid and a precipitate consisting of 3-cyclohexyl-5-carbomethoxyuracil which separated, was removed by filtration, and dried. After recrystallization from ethanol, 3-cyclohexyl-5-carbomethoxyuracil melted at about 282° C.

EXAMPLE 2

Preparation of 5-acetyluracil

A mixture of 5.0 g. of urea, 50 g. of ethyl orthoformate, and 13.0 g. of acetoacetic ester was heated to refluxing for about twelve hours. The excess ethyl orthoformate was removed by evaporation in vacuo, and the residue was taken up in warm ethanol. Upon cooling, a precipitate of ethyl ureidomethyleneacetoacetate was formed, and was removed by filtration. After recrystallization from ethanol, ethyl ureidomethyleneacetoacetate melted at about 194–195° C.

Ten g. of ethyl ureidomethyleneacetoacetate were added to 100 ml. of 7.5 percent aqueous potassium hydroxide solution, and the mixture was allowed to stand at room temperature for about five days. The reaction mixture was poured over about 100 g. of ice, and acidified using dilute hydrochloric acid. The resulting precipitate consisting of 5-acetyluracil was collected and dried. After recrystallization from ethanol, 5-acetyluracil melted with decomposition at about 295° C.

EXAMPLE 3

Preparation of 3-n-hexyl-5-carboxythiocytosine

A mixture of 17.4 g. of N-n-hexylthiourea, 29.6 g. of ethyl orthoformate and 8.5 g. of cyanoacetic acid was allowed to stand at room temperature for about forty-eight hours. The reaction mixture was evaporated to dryness in vacuo, and the residue was added to a solution of 10.8 g. of sodium methylate in 200 ml. of ethanol. The reaction mixture was allowed to stand at room temperature for about seventy-two hours. The ethanol was removed by evaporation in vacuo, about 100 ml. of water were added to the residue, and the resulting aqueous solution was acidified with hydrochloric acid. A precipitate of 3-n-hexyl-5-carboxythiocytosine which formed was removed by filtration. After recrystallization from ethanol the 3-n-hexyl-5-carboxythiocytosine thus prepared melted with decomposition at a temperature above 200° C.

EXAMPLE 4

Preparation of 3-cyclohexyl-5-carbamylcytosine

A mixture of 50 g. of cyclohexylurea and 100 ml. of ethyl orthoformate was refluxed for twelve hours. The resulting precipitate of 1,3-dicyclohexylcarbamyl-formamidine was filtered from the hot solution and washed with ether. After recrystallization from dimethylformamide, 1,3-dicyclohexylcarbamylformamidine melted at about 270° C.

To a suspension of 14.7 g. (0.05 mol) of 1,3-dicyclohexylcarbamyl-formamidine in 100 ml. of absolute ethanol were added 7.0 g. (0.1 mol) of cyanoacetamide, and the mixture was heated to 70° C. with stirring for about thirty minutes during which time the suspended material dissolved. The solution was concentrated by evaporation in vacuo of most of the ethanol whereupon the cyclohexylureidomethylenecyanoacetamide formed in the reaction precipitated. The precipitate was removed by filtration and dried. Cyclohexylureidomethylenecyanoacetamide thus prepared melted at about 242° C.

To a solution of 5.45 g. (0.237 gram-atom) of sodium metal in 500 ml. of absolute ethanol were added 56 g. (0.237 mol) of cyclohexylureidomethylenecyanoacetamide. The solution was allowed to stand at room temperature for seventy-two hours. The solution was then evaporated under reduced pressure to a volume of about 100 ml., an equal volume of water was added to the concentrated solution, and the aqueous solution was acidified with dilute acetic acid. A precipitate consisting of 3-cyclohexyl-5-carbamylcytosine formed. The precipitate was removed by filtration and recrystallized from dimethylformamide. 3 - cyclohexyl - 5 - carbamylcytosine thus prepared melted at about 245° C.

EXAMPLE 5

Preparation of 3-n-propyl-5-(N-n-amylcarbamyl)-cytosine

A mixture of 300 g. of n-amylamine and 400 g. of ethyl cyanoacetate was refluxed for about twenty-four hours. The reaction mixture was evaporated under reduced pressure leaving a residue which crystallized upon cooling. The crystalline N-cyanoacetyl-n-amylamine thus prepared was dissolved in hot ethyl acetate and treated with activated carbon. The hot solution was filtered, and the filtrate was concentrated by evaporation and cooled, whereupon a crystalline precipitate of N-cyanoacetyl-n-amylamine was formed. The substance was collected by filtration and dried. N-cyanoacetyl-n-amylamine thus prepared melted at about 53° C.

A mixture of 30 g. of N-cyanoacetyl-n-amylamine, 80 g. of ethyl orthoformate and 20 g. of n-propylurea was refluxed for about five hours. The reaction mixture was evaporated under reduced pressure and the residue was recrystallized from ethyl acetate. N-propylureidomethylenecyanoacetyl-n-amylamine thus prepared melted at about 174° C. after recrystallization from ethyl acetate.

Ten g. of N-propylureidomethylenecyanoacetyl-n-amylamine were dissolved in 200 ml. of methanol containing an equimolar amount of sodium methylate. The solution was allowed to stand at room temperature for twenty-four hours, and then was refluxed for eight hours. The methanol was removed in vacuo; 200 ml. of distilled water were added to the residue, and the mixture was acidified with acetic acid. The resulting precipitate of 3-n-propyl-5-(N-n-amylcarbamyl)-cytosine was removed by filtration, was dried and was then recrystallized from a mixture of ethyl acetate and ethanol. 3-n-propyl-5-(N-n-amylcarbamyl)-cytosinue thus prepared melted at about 178° C.

EXAMPLE 6

*Preparation of 3-ethyl-5-(N-p-methoxyphenylcarbamyl)-cytosine*

A mixture of 38 g. of N-cyanoacetylanisidine, prepared by the method of Daims et al. [J. Am. Chem. Soc. 35, 969 (1913)], 18 g. of N-ethylurea and 30 g., a molecular excess, of ethyl orthoformate was refluxed for about five hours. The mixture was then evaporated under reduced pressure and the residue was recrystallized from ethanol. The resulting ethylureidomethylenecyanoacetylanisidine melted at about 187° C.

To a solution of 25 g. of ethylureidomethylenecyanoacetylanisidine in 250 ml. of methanol was added an equimolecular quantity of sodium methylate. The solution was allowed to stand for twenty-four hours at room temperature and was then heated to refluxing for eight hours. The methanol was removed in vacuo, 300 ml. of water were added, and the solution was acidified with dilute acetic acid. A precipitate comprising 3-ethyl-5-(N-p-methoxyphenylcarbamyl)-cytosine formed. It was removed by filtration, dried, and recrystallized from a mixture of ethanol and dimethylformamide. The 3-ethyl-5-(N-p-methoxyphenylcarbamyl)-cytosine thus prepared melted at about 264° C.

EXAMPLE 7

*Preparation of 3-n-heptyl-5-(carboxymorpholido)-cytosine*

A mixture of 261 g. of morpholine and 339 g. of ethyl cyanoacetate was heated at about 110° C. for about twenty-four hours. On cooling, the reaction mixture crystallized. The crystalline residue was dissolved in hot ethyl acetate and treated with decolorizing carbon. On concentrating and cooling, N-cyanoacetylmorpholine crystallized. It was removed by filtration and dried. After recrystallization from ethyl acetate, N-cyanoacetylmorpholine melted at about 87° C.

A mixture of 44.2 g. of n-heptylurea, 43 g. of N-cyanoacetylmorpholine and a molecular excess of ethyl orthoformate was heated under reflux for about five hours. The mixture was concentrated in vacuo, and cooled, yielding a crystalline residue of n-heptylureidomethylenecyanoacetylmorpholine which, after recrystallization from ethyl acetate, melted at about 121–122° C.

To a solution of 25 g. of n-heptylureidomethylenecyanoacetylmorpholine in 150 ml. of methanol were added 4.1 g. of sodium methylate, and the solution was allowed to stand at room temperature for about forty-eight hours. The reaction mixture was then refluxed for about four hours, the alcohol was removed by evaporation in vacuo, and the residue was dissolved in a small amount of water. The water solution was made neutral with acetic acid, and the resulting precipitate, consisting of the 3-n-heptyl-5-(carboxymorpholido)-cytosine formed in the reaction, was removed by filtration and recrystallized from a mixture of ethyl acetate and ethanol. 3-n-heptyl-5-(carboxymorpholido)-cytosine thus prepared melted at about 160° C.

EXAMPLE 8

*Preparation of 3-methyl-5-carbethoxycytosine*

A mixture of 74 g. of N-methylurea, 170 g. of ethyl orthoformate and 130 g. of ethyl cyanoacetate was heated to refluxing for about twelve hours. The reaction mixture was concentrated under reduced pressure. Upon cooling, a precipitate consisting of ethyl methylureidomethylenecyanoacetate formed. The precipitate was removed by filtration, and recrystallized from ethyl acetate. Ethyl methylureidomethylenecyanoacetate thus prepared melted at about 156° C.

To a solution prepared by dissolving 4.6 g. of sodium metal in 200 ml. of absolute ethanol were added 39.4 g. of ethyl methylureidomethylenecyanoacetate, and the reaction mixture was heated to refluxing for about twelve hours. The ethanol was removed by evaporation in vacuo, and about 200 ml. of cold water were added to the residue. The aqueous mixture which resulted was acidified with dilute acetic acid, whereupon a precipitate consisting of 3-methyl-5-carbethoxycytosine formed. The substance was separated by filtration. After recrystallization from a mixture of ethanol and dimethylformamide. 3-methyl-5-carbethoxycytosine melted at about 230.5° C.

EXAMPLE 9

*Preparation of 3-β-hydroxyethyl-5-carbomethoxycytosine*

A mixture of 44 g. of N-β-hydroxyethylurea, 150 ml. of ethyl orthoformate and 49.5 g. of methyl cyanoacetate was heated under reflux for about eight hours. The volatile portion of the reaction mixture was removed by evaporation under reduced pressure. The residue of methyl β-hydroxyethylureidomethylenecyanoacetate, after crystallization from ethyl acetate, melted at about 159–160° C.

To a solution of 10.8 g. of sodium methylate in 200 ml. of methanol were added 42.6 g. of methyl β-hydroxyethylureidomethylenecyanoacetate, and the mixture was heated to refluxing for about sixteen hours. The methanol was removed by evaporation in vacuo, and about 200 ml. of water were added to the residue. The aqueous mixture was then neutralized with dilute acetic acid. The precipitate of 3-β-hydroxyethyl-5-carbomethoxycytosine which formed was removed by filtration. After recrystallization from ethanol, 3-β-hydroxyethyl-5-carbomethoxycytosine melted at about 195.5° C.

EXAMPLE 10

*Preparation of 3-methoxyethyl-5-cyanocytosine*

A mixture of 51 g. of N-methoxyethylurea, 100 g. of ethyl orthoformate and 33 g. of malononitrile was heated to refluxing for about two hours. The hot solution was concentrated under reduced pressure and was cooled in an ice bath. A precipitate consisting of methoxyethylureidomethylenemalononitrile was formed, and was collected. After recrystallization from a mixture of ethyl acetate and petroleum ether, methoxyethylureidomethylenemalononitrile melted at about 158° C.

To a solution of 13.7 g. of sodium methylate and 300 ml. of methanol were added 49 g. of methoxyethylureidoethylenemalononitrile. The solution was allowed to stand at room temperature for about three days, and the methanol was then removed by evaporation under reduced pressure. About 100 ml. of water were added to the residue, and the aqueous solution resulting was acidified with dilute acetic acid. A precipitate consisting of 3-methoxyethyl-5-cyanocytosine formed. It was removed by filtration, and recrystallized from ethanol. 3-methoxyethyl-5-cyanocytosine thus prepared melted at about 228° C.

EXAMPLE 11

*Preparation of 3-benzyl-5-carbethoxycytosine*

A mixture of 100 g. of N-benzylurea, 148 g. of ethyl orthoformate and 75 ml. of ethyl cyanoacetate was refluxed for about eight hours. The volatile portion of the reaction mixture was removed by evaporation in vacuo, and the residue, consisting of ethyl benzylureidomethylenecyanoacetate, was recrystallized from ethanol.

To a solution prepared by dissolving 11.5 g. of sodium metal in 500 ml. of ethanol were added 136 g. of ethyl benzylureidomethylenecyanoacetate. The reaction mixture was heated to refluxing for about twelve hours, the alcohol was removed by evaporation in vacuo, and 200 ml. of water were added to the residue. The aqueous mixture was made slightly acidic with dilute acetic acid, and a precipitate of 3-benzyl-5-carbethoxycytosine was formed. After recrystallization from a mixture of ethanol and dimethylformamide, 3-benzyl-5-carbethoxycytosine melted at 182° C.

EXAMPLE 12

*Preparation of 3-n-heptyl-5-carboxycytosine*

A mixture of 60 g. of N-n-heptylurea, 200 ml. of ethyl orthoformate and 56 g. of cyanoacetic acid was stirred at room temperature for twenty-four hours. The volatile material was removed under reduced pressure, leaving a solid residue of 76.5 g. of n-heptylureidomethylenecyanoacetic acid. The n-heptylureidomethylenecyanoacetic acid thus prepared was added to a solution of 18.2 g. of sodium methylate in 700 ml. of methanol. The solution was refluxed for forty-eight hours. The reaction mixture was treated with a small amount of activated carbon, the carbon was filtered off, and the filtrate was concentrated in vacuo to a volume of about 200 ml. About 500 ml. of water were added to the concentrate, and the resulting aqueous solution was neutralized with acetic acid. The precipitate of 3-n-heptyl-5-carboxycytosine which formed was collected on a filter and washed with water. 3-n-heptyl-5-carboxycytosine thus prepared melted at about 234° C., with decomposition.

EXAMPLE 13

*Preparation of 4,5-dicarbethoxypyrimidine*

A mixture of 60 g. of urea, 300 g. of ethyl orthoformate and 188 g. of diethyl oxalacetate was heated under reflux for about twelve hours. The excess of ethyl orthoformate was removed from the reaction mixture by distillation under reduced pressure, the sirupy residue was cooled, and 300 ml. of ether were added thereto. A solid, consisting of 4,5-dicarbethoxypyrimidine, formed, and was collected. After recrystallization from ethyl acetate, 4,5-dicarbethoxypyrimidine melted at about 154° C.

EXAMPLE 14

*Preparation of 4-methyl-5-acetylpyrimidine*

The procedure of Example 3 was followed, except that 5 g. of urea, 29.6 g. of ethyl orthoformate and 10 g. of acetylacetone were used. The reaction mixture was refluxed for about eight hours, cooled and added to a solution of about 10.8 g. of sodium methylate in 200 ml. of ethanol. After addition of water and acidification of the mixture, a precipitate consisting of 4-methyl-5-acetylpyrimidine formed. The precipitate was collected, and dried. 4-methyl-5-acetylpyrimidine melted with decomposition above 200° C.

I claim:

1. The process for the preparation of substituted pyrimidines which comprises heating together a compound represented by the formula

wherein Y and Z represent radicals of the group consisting of cyano, carbamyl, carboxyl, lower carbalkoxy, lower aliphatic carboxyacyl and lower alkoxyoxalyl radicals; an alkyl orthoformate, and a compound represented by the formula

wherein R represents a member of the group consisting of hydrogen, lower alkyl, cyclohexyl, lower hydroxyalkyl, lower alkoxyalkyl and phenyl-substituted lower alkyl radicals, and X represents a member of the group consisting of oxygen and sulfur; and subjecting the product thereof to the action of a strong base.

2. The process for the preparation of substituted pyrimidines which comprises heating together an alkyl orthoformate and a compound represented by the formula

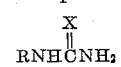

wherein R represents a member of the group consisting of hydrogen, lower alkyl, lower hydroxyalkyl, cyclohexyl, lower alkoxyalkyl and phenyl-substituted lower alkyl radicals and X represents a member of the group consisting of oxygen and sulfur; thereby to produce a substituted dicarbamylformamidine compound; heating the said formamidine compound with a compound represented by the formula

wherein Y and Z represent radicals of the group consisting of cyano, carbamyl, carboxyl, lower carbalkoxy, lower aliphatic carboxyacyl and lower alkoxyoxalyl radicals; and subjecting the reaction product thereof to the action of a strong base.

3. In the process for the preparation of substituted pyrimidines, the step which comprises heating together an alkyl orthoformate, a compound having the formula

wherein R represents a member of the group consisting of hydrogen, lower alkyl, cyclohexyl, lower hydroxyalkyl, lower alkoxyalkyl and phenyl-substituted lower alkyl radicals and X represents a member of the group consisting of oxygen and sulfur, and a compound represented by the formula

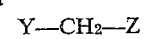

wherein Y and Z represent radicals of the group consisting of cyano, carbamyl, carboxyl, lower carbalkoxy, lower aliphatic carboxyacyl and lower alkoxyoxalyl radicals.

4. The process for the preparation of substituted pyrimidines which comprises heating together at a temperature in the range of from about 20° C. to about 150° C. an alkyl orthoformate, a compound represented by the formula

wherein R represents a member of the group consisting of hydrogen, lower alkyl, cyclohexyl, lower hydroxyalkyl, lower alkoxyalkyl and phenyl-substituted lower alkyl radicals, and X represents a member of the group consisting of oxygen and sulfur, and a compound represented by the formula

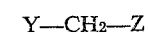

wherein Y and Z represent radicals of the group consisting of cyano, carbamyl, carboxyl, lower carbalkoxy, lower aliphatic carboxyacyl and lower alkoxyoxalyl radicals; and subjecting the product thereof to the action of an alkali metal alkoxide.

5. In the process for the preparation of substituted pyrimidines, the step which comprises heating together at a temperature in the range of from about 20° C. to about 150° C. an alkyl orthoformate and a compound having the formula

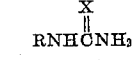

wherein R represents a member of the group consisting of hydrogen, lower alkyl, cyclohexyl, lower hydroxyalkyl, lower alkoxyalkyl and phenyl-substituted lower alkyl radicals, and X represents a member of the group consisting of oxygen and sulfur, to form a dicarbamylformamidine compound.

6. In the process for the preparation of substituted pyrimidines, the step which comprises heating together a compound represented by the formula $$Y-CH_2-Z$$

wherein Y and Z represent radicals of the group consisting of cyano, carbamyl, carboxyl, lower aliphatic carboxyacyl, lower carbalkoxy and lower alkoxyoxalyl radicals and a dicarbamylformamidine compound represented by the formula $$RNH\overset{X}{\underset{\|}{C}}N=CHNH\overset{X}{\underset{\|}{C}}NHR$$

wherein R represents a member of the group consisting of hydrogen, lower alkyl, cyclohexyl, lower hydroxyalkyl, lower alkoxyalkyl and phenyl-substituted lower alkyl radicals and X represents a member of the group consisting of oxygen and sulfur, to produce a substituted ureidoethylene compound.

No references cited.